(No Model.)
J. MULLIGAN.
COOKING BOILER.
No. 567,490.  Patented Sept. 8, 1896.
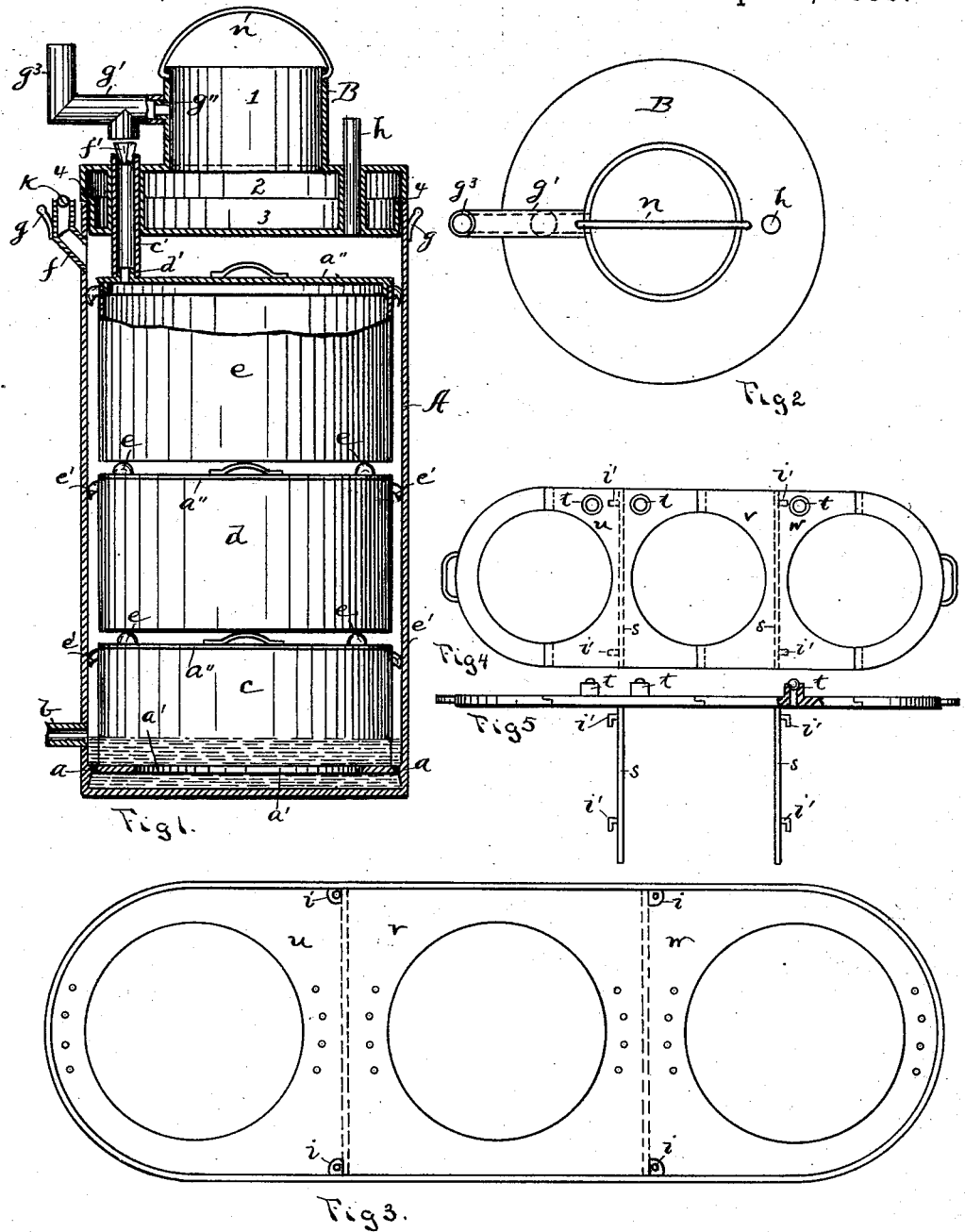
Witnesses
S. Longenecker
L. A. Wright
Inventor
John Mulligan
By R. J. McCarty
his Attorney
THE NORRIS PETERS CO., PHOTO-LITHO., WASHINGTON, D. C.

UNITED STATES PATENT OFFICE.

JOHN MULLIGAN, OF NATIONAL MILITARY HOME, OHIO.

COOKING-BOILER.

SPECIFICATION forming part of Letters Patent No. 567,490, dated September 8, 1896.

Application filed January 22, 1896. Serial No. 576,381. (No model.)

*To all whom it may concern:*

Be it known that I, JOHN MULLIGAN, a citizen of the United States, residing at the National Military Home, in the county of Montgomery and State of Ohio, have invented certain new and useful Improvements in Cooking-Boilers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in boilers, and has a more special reference to cooking-boilers or boilers for domestic use.

The object of said invention is to provide an efficient cooking-boiler with the advantages hereinafter set forth in the specification, and pointed out in the claim.

Referring to the annexed drawings, upon which similar letters of reference indicate corresponding parts, Figure 1 is a vertical section through the center of the boiler. Fig. 2 is a top view of Fig. 1. Figs. 3, 4, and 5 are views of a modification wherein the cover shown in Fig. 1 may be used on three or more boilers of oblong shape.

The letter A designates an upright cylindrical vessel having a false bottom $a$ and a valve-controlled pipe $b$ entering above said bottom $a$, the latter being loose and provided with an opening $a'$, so water may enter below it, as shown.

$c$, $d$, and $e$ designate, respectively, vessels which are placed one on the other. The two lower vessels have upon their lids $a''$ a series of projections $e$, upon which the next upper vessel rests. $e'$ designates similar projections on the sides of the vessels, with which the hooks of a curved handle may be attached to fit said vessels.

$f$ designates a spout on the upper part of the vessel A, and $g$ $g$ are handles by which said vessel may be lifted.

Coming now to the most important feature of the invention, B designates the lid or cover, which has three diameters 1, 2, and 3, the latter diameter providing an annular shoulder 4, that comes in contact with the upper edge of the vessel A when placed thereon.

$h$ designates a tube inserted in an opening in the cover and projecting above, as shown. The object of this tube is to provide a place for a thermometer to register the temperature of the boiler if such is desired.

$c'$ designates a tube fitted upon a nozzle $d'$, that projects from the cover $a''$ of the vessel $e$. This tube $c'$ projects through an opening in the cover B, and affords a passage to the interior of the vessel $e$ through the lid when not closed by the plug or stopper $f'$. $g'$ designates an elbow fitted and adapted to turn upon a nozzle $g''$, that projects from the upper part of the cover. The upper part of said cover is adapted to hold water, which may enter the vessel $e$ through the nozzle $g''$ and tube $c'$, or said water may be passed into the vessel A through the spout $f$ by turning the elbow $g'$ so as to bring the end $g^3$ over the spout $f$. When water is not being introduced into said spout $f$ in this manner, the said spout may be closed with a stopper $k$.

$n$ designates a handle or bail by which the cover B is removed.

Referring to the modifications shown in Figs. 3, 4, and 5, the boiler is oblong and has lugs $i$, that project from its inner sides near the top and bottom. These lugs have openings to receive hooks $i'$ on partition-plates $s$, which divide the oblong boiler into three compartments $u$, $v$, and $w$. $t$ designates spouts corresponding to the spout $f$ in Fig. 1, and onto which the elbow $g'$ may be turned to introduce water. In these modified forms the cover B is used without any change. In practice the said cover B acts as a condenser to transform the steam and return it in liquid form to the vessel A, and should the condensation not take place as rapidly as the steam accumulates the said steam may find an outlet through the spout $f$ and tube $c'$.

Having described my invention, I claim—

In a cooking-boiler, the combination with the vessel A having a detachable false bottom with an opening therein, and a vessel $e$ mounted in the upper part of said vessel A, of a cover B having its top hollow and adapted to contain water, an elbow communicating therewith, a tube projecting through said cover and communicating with the vessel e, and with which said elbow may be connected, a spout projecting from the boiler A with which said elbow may be connected, whereby water may be fed from the interior of the cover B to the boiler A or the vessel e as herein shown and described.

In testimony whereof I affix my signature in presence of two witnesses.

JOHN MULLIGAN.

Witnesses:
R. J. McCARTY,
JOHN MEYER.